US012384128B2

(12) United States Patent
Sahin et al.

(10) Patent No.: US 12,384,128 B2
(45) Date of Patent: Aug. 12, 2025

(54) CORNET CONE TIP CRIMPING MACHINE

(71) Applicant: Mondi Kale Nobel Ambalaj Sanayi Ve Ticaret Anonim Sirketi, Istanbul (TR)

(72) Inventors: Umit Sahin, Kirklareli (TR); Mehmet Ulas Ipek, Istanbul (TR)

( * ) Notice: Subject to any disclaimer, the term of this patent is extended or adjusted under 35 U.S.C. 154(b) by 0 days.

(21) Appl. No.: 18/849,781

(22) PCT Filed: Aug. 2, 2022

(86) PCT No.: PCT/TR2022/050806
§ 371 (c)(1),
(2) Date: Sep. 23, 2024

(87) PCT Pub. No.: WO2023/195939
PCT Pub. Date: Oct. 12, 2023

(65) Prior Publication Data
US 2025/0196463 A1 Jun. 19, 2025

(51) Int. Cl.
*B31C 7/00* (2006.01)
*B31C 7/08* (2006.01)

(52) U.S. Cl.
CPC .................................... *B31C 7/08* (2013.01)

(58) Field of Classification Search
CPC ........... B31C 7/08; B31C 11/00; B31C 99/00; B31C 11/02; B31C 7/10; B65D 85/78; B65D 3/06; B65D 65/42; B65D 2203/00; B65D 25/54; B65D 3/262; B65D 2565/385; B65D 1/28; B31B 2110/10; B31B 2160/30; B31B 50/34; B31B 2100/002; B31B 70/30
USPC ........................................................ 493/296
See application file for complete search history.

(56) References Cited

U.S. PATENT DOCUMENTS

| | | | | |
|---|---|---|---|---|
| 2,385,604 A * | 9/1945 | Brewer | B31B 50/322 | 493/82 |
| 3,391,617 A * | 7/1968 | Wise | B65D 85/78 | 493/149 |
| 2017/0137157 A1* | 5/2017 | Irwin | B65B 59/001 | |

OTHER PUBLICATIONS

International Search Report for corresponding PCT/TR2022/050806 dated Apr. 10, 2023.
Written Opinion of the International Searching Authority for corresponding PCT/TR2022/050806 dated Apr. 10, 2023.

* cited by examiner

*Primary Examiner* — Jacob A Smith
(74) *Attorney, Agent, or Firm* — Egbert, McDaniel & Swartz, PLLC

(57) ABSTRACT

Disclosed is a tip crimping machine which is used with the purpose of wrapping the conically shaped cornet cone packages of cornet-type ice-creams and which provides for the cone tip to be straight and robust and all the cornet cone packages to be produced in the same standard size by folding the cone tip by crimping the same inwards during the wrapping of cornet cone packages by being rotated on the conical crimping end.

5 Claims, 2 Drawing Sheets

CORNET CONE TIP CRIMPING MACHINE

TECHNICAL FIELD

Figure 1:
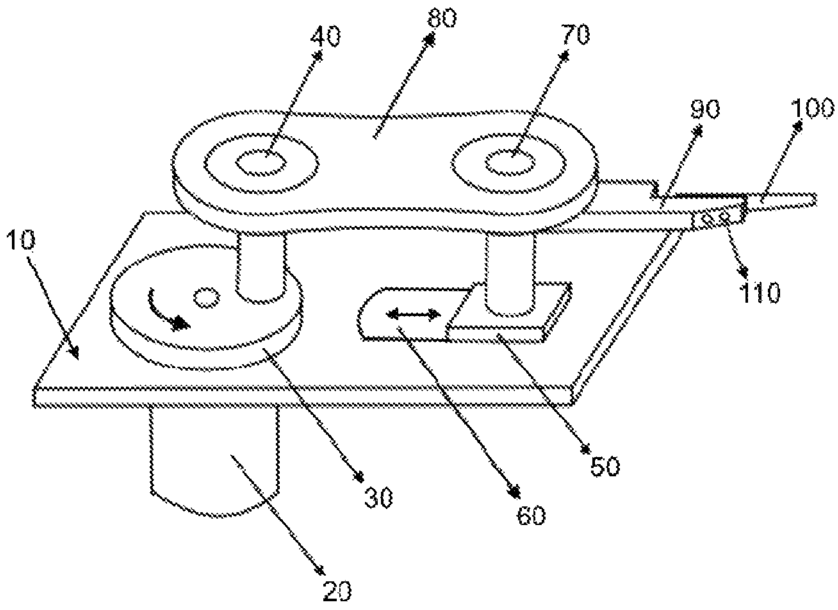

The invention is related to a tip crimping machine which is used with the purpose of wrapping the conically shaped cones of cornet-type ice-creams.

The invention is particularly related to a cornet cone tip crimping machine which provides for the cone tip to be straight and robust, and all the cornet cone packages to be produced in the same standard size by folding the conical end portions by means of crimping the same inwards during the rotational wrapping of cornet cone packages.

PRIOR ART

Cornet-type ice-creams are among the top popular ice-creams frequently consumed. These ice-creams basically have conically shaped cornets filled with ice-creams having contents such as chocolate, toppings, fruits, nuts etc. Said cornets are sold by being placed in sleeve-like packages that cover the cornet part.

In the art, standard cornet cone packages are produced in machines and the end portions of the conically shaped cornets produced in said packaging machines take a pointed form during crimping. Due to the tapering formed at the end portions of the cornet cone packages, adverse conditions occur during storing, transferring the packages and while the ice-cream cones are placed within the package on the production line. Due to the pointed end becoming folded on some packages the products placed have different heights and this causes production setbacks by preventing standardization in the packaging machines during ice-cream production. At the same time, due to the pointed end becoming folded, problems occur with the stacking of the cornet cone packages placed within each other, and the length difference emerging as the packages are placed within each other due to the folded pointed end causes problems in production lines. Therefore, there is a need for a machine which provides that the problems that occur during the cornet cone package production are eliminated.

In consequence, the presence of the above-mentioned problems and inefficiency of the present solutions requires a development in the related technical field.

PURPOSE OF THE INVENTION

The present invention is related to a cornet cone tip crimping machine which eliminates the above-mentioned disadvantages and brings new advantages to the related technical field.

The main purpose of the invention is to present an end crimping machine which provides that the cone tip has a straight and robust structure by the conical end portions being crimped inwards during the rotational wrapping of the cornet cone packages.

The purpose of the invention is to present a tip crimping machine which provides that the cornet cone packages are produced in the same standard length.

Another purpose of the invention is to provide that the problems that occur with the packages being placed within each other during the storage, transfer, and placement of the ice-cream cones within the package on the production line are eliminated by removing the length differences of cornet cone packages.

In order to fulfill the above-mentioned purposes and the ones that can be inferred from the detailed description; the invention is a tip crimping machine used with the purpose of wrapping the conically shaped cornet cone packages of the cornet-type ice-creams, comprising

- a lower table having a fixed structure,
- rotation disk making a rotational movement on the lower table,
- drive motor which rotates the rotation disk on the lower surface of the lower table,
- rotation joint which is connected on the rotation disk away from the rotation disk center and which makes a rotational movement with the rotation disk,
- a crimping arm rail located on the lower table,
- a sled moving back and forth within the crimping arm rail,
- a pushing joint which is located on the sled, and which moves back and forth with the sled,
- a crimping arm table which is connected on the rotation joint and pushing joint and which transforms the rotational force into pushing and pulling force depending on the rotational movement of the rotation joint and the back-and-forth movement of the pushing joint,
- a crimping arm which is fixed at the front side of the crimping arm table, and which moves back and forth by means of the crimping arm table,
- a crimping arm which is connected to the crimping arm end, and which provides for the cone tip to be crimped inwards during the wrapping procedure of the cornet cone package which is wrapped by being rotated on the conical crimping tip after arriving from the package transmission table,
- a crimping guide which is connected to the bottom of the end portion of the conical crimping tip and which prevents the cornet cone package from slipping by pushing the cone tip towards the crimping arm during the back and forth motion of the crimping arm, and which also directs the cornet cone package to the conical crimping tip b pushing the same towards the cornet cone package crimping arm.

The structural and characteristic features and all the advantages of the invention will be understood more clearly thanks to the figures given below and the detailed description written by making references to these figures. Therefore, the evaluation should be made in consideration of these figures and the detailed description.

FIGURES AIDING THE DESCRIPTION OF THE INVENTION

FIG. 1: Representational view of the tip crimping machine of the invention.

Figure 2:
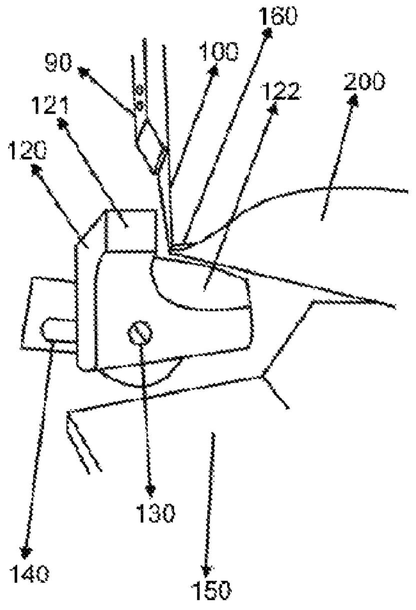

FIG. 2: Detailed view of the tip crimping machine of the invention.

Figure 3:
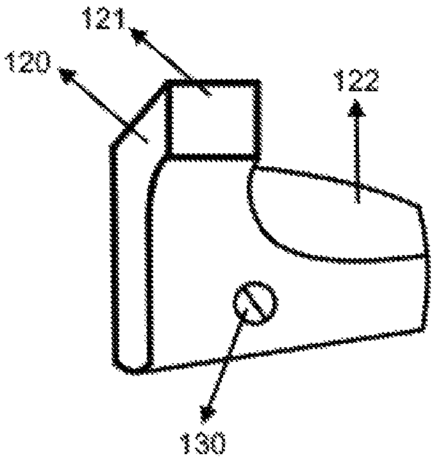

FIG. 3: View of the crimping guide of the tip crimping machine of the invention.

Figure 4:
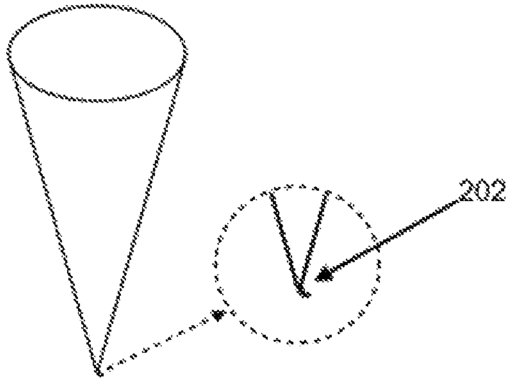

FIG. 4: Representational view of the cornet cone package having the cone tip in the art having a pointed structure.

Figure 5:
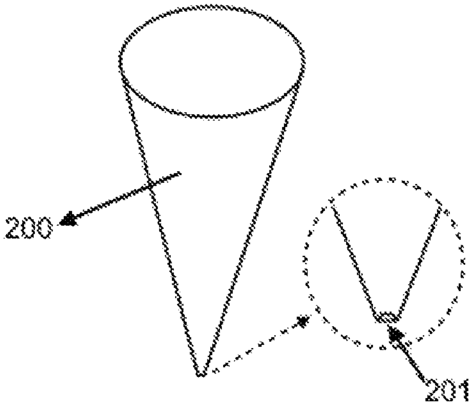

FIG. 5: Representational view of the cornet cone package having a straight cone tip crimped with the tip crimping machine of the invention.

DESCRIPTION OF THE REFERENCE PARTS

10. Lower table
20. Drive motor
30. Rotation disk
40. Rotation joint
50. Sled
60. Crimping arm rail

70. Pushing joint
80. Crimping arm table
90. Crimping arm
100. Crimping end
110. Connection element
120. Crimping guide
121. Guide peak
122. Crimping curve
130. Fixing element
140. Guide adjusting sleeve
150. Package transmission table
160. Conical crimping end
200. Cornet cone package
201. Cone tip
202. Cone tip in the art

DETAILED DESCRIPTION OF THE INVENTION

In this detailed description the preferred alternatives of the tip crimping machine of the invention are described only for a better understanding of the subject and in the way to create no limiting effect whatsoever.

In FIG. 1, representational view of the tip crimping machine of the invention has been given. Accordingly, the tip crimping machine basically comprises a lower table (10) having a fixed structure, a rotation disk (30) making a rotational movement by means of the driving motor (20) on the lower table (10), rotation joint (40) which is connected on the rotation disk (30) away from the rotation disk center (30) and which makes a rotational movement with the rotation disk (30), a sled (50) which moves back and forth within a crimping arm rail (60) located on the lower table (10), a pushing joint (70) moving back and forth on the sled (50), a crimping arm table (80) which is connected on the rotation joint (40) and pushing joint (70) and which transforms the rotational force into pushing and pulling force depending on the rotational movement of the rotation joint (40) and the back and forth movement of the pushing joint (70), a crimping arm (90) which is fixed at the front side of the crimping arm table (80) and which moves back and forth by means of the crimping arm table (80), a crimping arm (100) which crimps the cone tip (201) inwards during the wrapping procedure of the cornet cone package (200) which is wrapped by being rotated on the conical crimping tip (160) after arriving from the package transmission table (150) at the end of the crimping arm (90), a crimping guide (120) which is connected to the bottom of the end portion of the conical crimping tip (160) by means of guide adjusting sleeve (140) and which prevents the cornet cone package (200) from slipping during the back and forth motion of the crimping arm (90), and which also directs the cornet cone package (200) to the conical crimping tip (160) by pushing the same towards the cornet cone package (200) crimping arm (90).

A rotation disk (30) is placed at the back side of a lower table (10) having a fixed structure on the tip crimping machine of the invention. Said rotation disk (30) makes a rotation movement by means of a drive motor (20) which is located on the bottom surface of the lower table (10). On the rotation disk (30), a rotation joint (40) is connected away from the rotation disk center (30). Said rotation joint (40) makes a rotational movement with the rotation disk (30).

There is a crimping arm rail (60) at the front side of the lower table (10) as well. A sled (50) moving back and forth is placed inside said crimping arm rail (60). On the sled (50), there is a pushing joint (70) moving back and forth with the sled (50).

A crimping arm table (80) is connected on the rotation joint (40) and pushing joint (70). Said crimping arm table (80) transforms the rotational force into pushing and pulling force depending on the rotational movement of the rotation joint (40) and the back-and-forth movement of the pushing joint (70).

A crimping arm (90) is fixed at the front side of the crimping arm table (80). Said crimping arm (90) moves back and forth by means of the crimping arm table (80). At the end of the crimping arm (90), a crimping end (100) is connected by means of at least one connection element (110). The crimping end (100) provides the inwards crimping of the cone tip (201) during the wrapping of the cornet cone package (200) wrapped by being rotated onto the conical crimping end (160) after arriving from the package transmission table (150). Thereby instead of the cone tip (202) in the art which has a pointed structure seen in FIG. 4 of the cornet cone package (200) a straight cone tip (201) as seen in FIG. 5 is obtained.

During the wrapping of the cornet cone package (200) which has arrived from the package transmission table (150) in the open state by being rotated onto the conical crimping end (160) and during the crimping of the cone tip (201) with the crimping end (100) in the wrapping process, a crimping guide (120) is connected under the end portion of the conical crimping end (160) as seen in FIG. 2 for guiding the cornet cone package (200). Said crimping guide (120) is connected within a guide adjusting sleeve (140) by means of at least one fixing element (130), such that it can be adjusted by being moved back and forth.

On the crimping guide (120) seen in FIG. 3, there is a guide peak (121) extending upwards. Said guide peak (121) prevents the cornet cone package (200) wrapped by being rotated on the conical crimping end (160) during the back-and-forth movement of the crimping arm (90) from slipping and also, pushes the cone tip (201) of the cornet cone package (200) towards the crimping arm (90). In addition, a crimping curve (122) having a puffed structure in the middle, getting thinner towards the sides is formed on the crimping guide (120). Said crimping curve (122) pushes the cornet cone package (200) towards the crimping arm (90) and guides the cornet cone package (200) to the conical crimping end (160).

The working principle of the tip crimping machine according to the invention is as follows;

The cornet cone package (200) arrives from the package transmission table (150) in the open state, guided to the crimping guide (120), and wrapped on the conical crimping end (160) that makes a rotational movement by being rotated. In the meantime, it is provided that the cornet tip (201) is crimped inwards by means of the crimping end (100) at the end of the crimping arm (90) which moves back and forth by means of the crimping arm table (80). The guide peak (121) on the crimping guide (120) prevents the cornet cone package (200) wrapped by being rotated on the conical crimping end (160) during the back-and-forth movement of the crimping arm (90) from slipping and also pushes the cone tip (201) of the cornet cone package (200) towards the crimping arm (90). Said crimping curve (122) on the crimping guide (120) pushes the cornet cone package (200) towards the crimping arm (90) and guides the cornet cone package (200) to the conical crimping end (160). Thereby, it is provided that the cone tip (201) has a straight structure as shown in FIG. 5 during the wrapping of the cornet cone package (200) by being rotated onto the conical crimping end (160).

The invention claimed is:

1. A tip crimping machine used with the purpose of wrapping conically shaped cornet cone package of cornet-type ice-creams, the tip crimping machine comprising:

a lower table having a fixed structure;

a rotation disk making a rotational movement on the lower table;

a drive motor which rotates the rotation disk on the lower surface of the lower table;

a rotation joint which is connected on the rotation disk away from the rotation disk center and which makes a rotational movement with the rotation disk;

a crimping arm rail located on the lower table;

a sled moving back and forth within the crimping arm rail;

a pushing joint which is located on the sled, and which moves back and forth with the sled;

a crimping arm table which is connected on the rotation joint and pushing joint, and which transforms the rotational force into pushing and pulling force depending on the rotational movement of the rotation joint and the back-and-forth movement of the pushing joint;

a first crimping arm which is fixed at the front side of the crimping arm table, and which moves back and forth by means of the crimping arm table;

a second crimping arm which is connected to the crimping arm end, and which provides for the cone tip to be crimped inwards during the wrapping procedure of the cornet cone package which is wrapped by being rotated on the conical crimping tip after arriving from the package transmission table;

a crimping guide which is connected to the bottom of the end portion of the conical crimping tip and which prevents the cornet cone package from slipping by pushing the cone tip towards the first crimping arm during the back and forth motion of the first crimping arm, and which also directs the cornet cone package to the conical crimping tip by pushing the same towards the cornet cone package first crimping arm.

2. A tip crimping machine according to claim 1, comprising a guide adjusting sleeve which provides that said crimping guide is connected under the end portion of the crimping end by means of at least one fixing element, such that it can be adjusted by being moved back and forth.

3. A tip crimping machine according to claim 1, comprising a guide peak which extends upwards on said crimping guide and prevents the cornet cone package that is wrapped by being rotated on the conical crimping end during the back and forth movement of the first crimping arm from slipping and also pushes the cone tip of the cornet cone package towards the first crimping arm.

4. A tip crimping machine according to claim 1, comprising a crimping curve having a puffed structure in the middle, getting thinner towards the sides, which is located on said crimping guide and which pushes the cornet cone package towards the first crimping arm and guides the cornet cone package to the conical crimping end.

5. A tip crimping machine according to claim 1, comprising at least one connection element which provides for the connection of said crimping end to the first crimping arm end.

* * * * *